United States Patent
Zhang et al.

(10) Patent No.: US 8,437,389 B2
(45) Date of Patent: May 7, 2013

(54) STATISTICAL REMULTIPLEXING OF COMPRESSED VIDEO SEGMENTS

(75) Inventors: Ji Zhang, Monte Sereno, CA (US); Hain-Ching Humphrey Liu, Fremont, CA (US); Jian-Gang Ding, San Jose, CA (US)

(73) Assignee: Software Site Applications, Limited Liability Company, Wilmington, DE (US)

( * ) Notice: Subject to any disclaimer, the term of this patent is extended or adjusted under 35 U.S.C. 154(b) by 160 days.

(21) Appl. No.: 12/902,845

(22) Filed: Oct. 12, 2010

(65) Prior Publication Data
US 2011/0026584 A1 Feb. 3, 2011

Related U.S. Application Data

(62) Division of application No. 10/633,111, filed on Aug. 1, 2003, now Pat. No. 7,835, 437.

(60) Provisional application No. 60/453,673, filed on Mar. 10, 2003.

(51) Int. Cl.
  *H04N 7/12* (2006.01)
  *H04N 11/02* (2006.01)
  *H04N 11/04* (2006.01)

(52) U.S. Cl.
  USPC .................................................. 375/240.03

(58) Field of Classification Search ............... 375/240.03
  See application file for complete search history.

(56) References Cited

U.S. PATENT DOCUMENTS

| | | | |
|---|---|---|---|
| 5,130,984 A | 7/1992 | Cisneros | |
| 5,606,369 A | 2/1997 | Keesman et al. | |
| 5,742,361 A | 4/1998 | Nakase et al. | |
| 6,055,270 A | 4/2000 | Ozkan et al. | |
| 6,351,491 B1 | 2/2002 | Lee et al. | |
| 6,456,851 B1 | 9/2002 | Sucharczuk et al. | |
| 6,643,327 B1 * | 11/2003 | Wang | 375/240.12 |
| 6,795,506 B1 * | 9/2004 | Zhang et al. | 375/240.26 |
| 6,807,363 B1 | 10/2004 | Abiko et al. | |
| 6,925,120 B2 * | 8/2005 | Zhang et al. | 375/240.08 |
| 7,206,352 B2 | 4/2007 | Birru et al. | |
| 7,212,726 B2 | 5/2007 | Zetts | |
| 2002/0013948 A1 | 1/2002 | Aguayo et al. | |
| 2003/0041258 A1 * | 2/2003 | Wee et al. | 713/193 |

OTHER PUBLICATIONS offset (2009) In Merriam-Webster Online Dictionary. Retrieved Aug. 31, 2009, from http://www.merriam-webster/dictionary/offset.
Chi-Yuan Hsu, et al.; Rate Control for Robust Video Transmission over Burst-Error Wireless Channels; May 1999; IEEE Journal on Selected Areas in Communications, vol. 17, No. 3, pp. 756-773.

* cited by examiner

*Primary Examiner* — Mehrdad Dastouri
*Assistant Examiner* — Jeremaiah C Hallenbeck-Huber
(74) *Attorney, Agent, or Firm* — Stolowitz Ford Cowger LLP

(57) ABSTRACT

Compressed digital video bitstreams are segmented into video segments. A staging processor performs transrating on the original video segments and generates several transrated output video segments. The output video segments are combined into a video block for further distribution. A bit rate switch selects among the transrated video segments from the video block to provide a statistically multiplexed output bitstream. The bit rate switch can also select local stream segments, such as advertisements, for content insertion purposes. A transprocessor including multiple encoder output features is also provided.

18 Claims, 7 Drawing Sheets

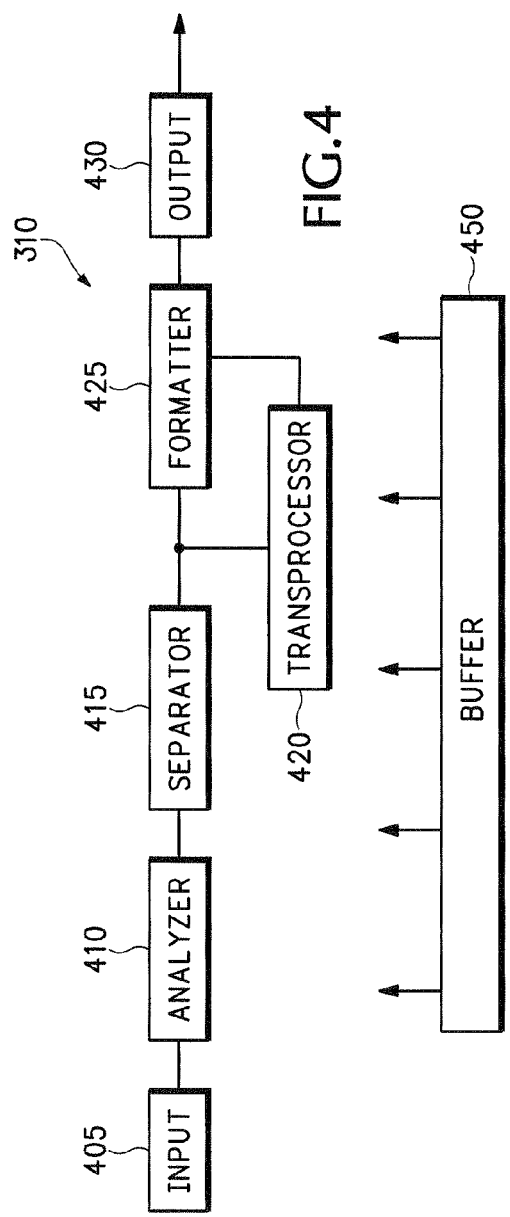
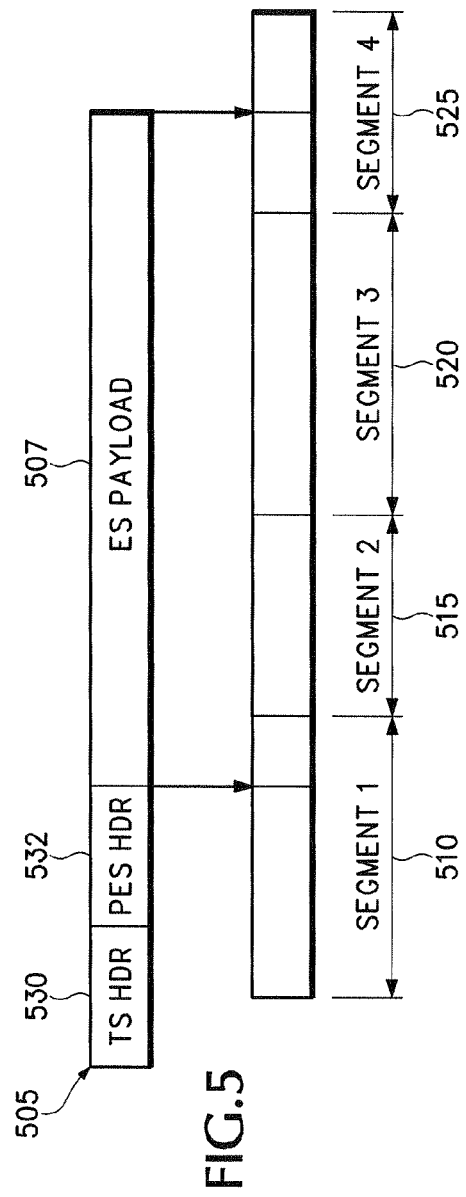

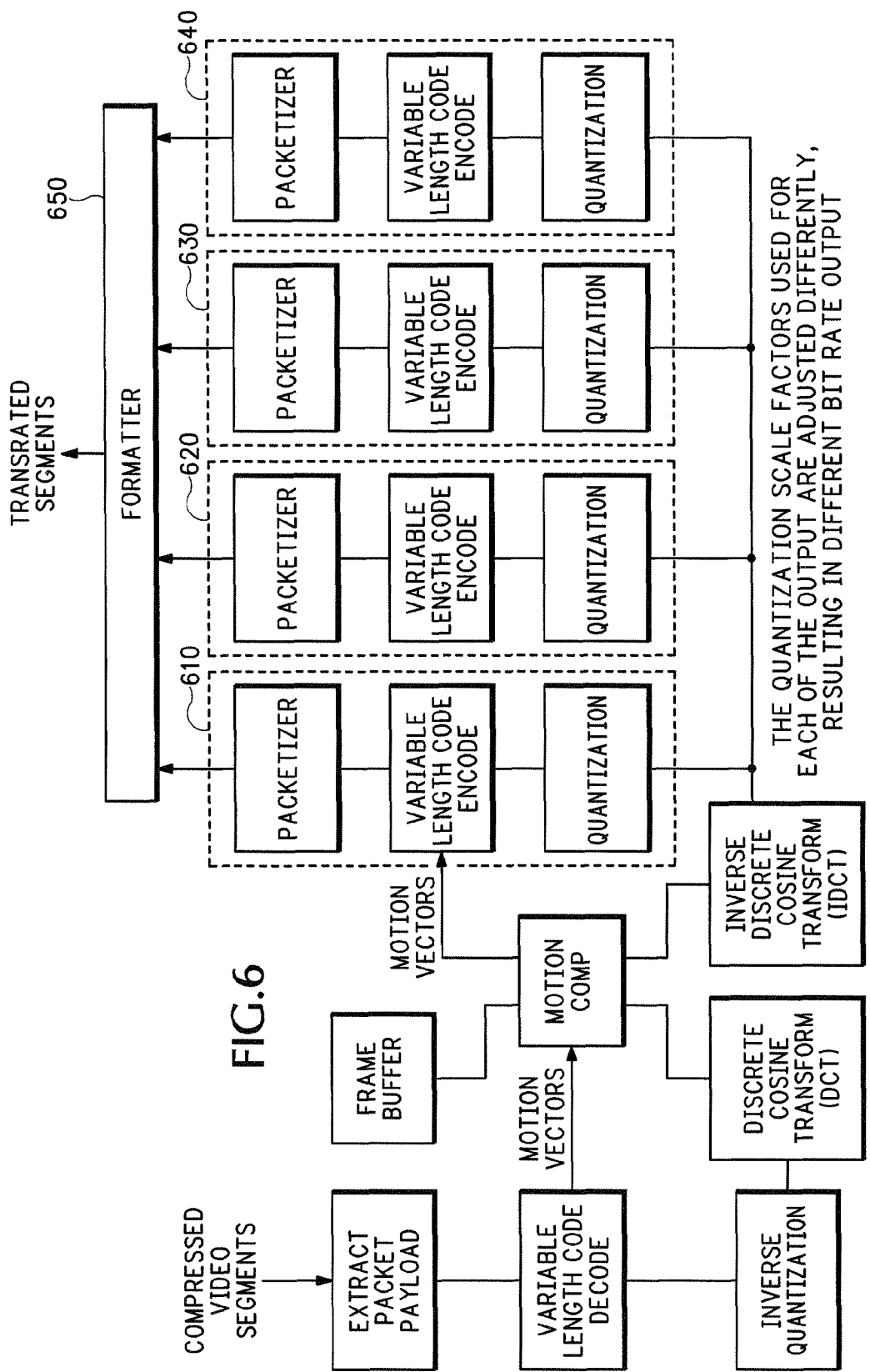

STATISTICAL REMULTIPLEXING OF COMPRESSED VIDEO SEGMENTS

RELATED APPLICATION

This application is a division of U.S. patent application Ser. No. 10/633,111, filed Aug. 1, 2003, now U.S. Pat. No. 7,835,437 which claims the benefit under 35 U.S.C. §119(e) of U.S. Provisional Patent Application No. 60/453,673, filed on Mar. 10, 2003, entitled "Statistical Remultiplexing of Compressed Video Stream Segments," both of which are incorporated by reference herein in their entirety.

TECHNICAL FIELD

This invention relates generally to content delivery systems, and more particularly, to digital video storage and distribution.

BACKGROUND

Video display is one of the most effective means of visual communication. Video display includes presenting a sequence of digital images, also called video frames, to a user. Typically at least 24 frames are displayed per second. To convert an analog video signal into digital video signal, digitization is needed to convert each video image into digital samples, called pixels. For the North American television system (NTSC), the frame rate is 30 frames per second with each frame including up to 720×486 pixels for standard definition. For part of Europe and Asia, the standard frame rate is 25 frames per second, at 720×525 pixels. Although the resulting digitized video represents an accurate representation of the original video signal, it also represents massive amount of data, typically in the range of 150-270 Mbps (megabits per second) for real-time display. Such a high bit rate is prohibitive for low cost distribution and storage.

Digital video compression techniques were developed to reduce the amount of data required to represent the digital video signal. The video compression process can be applied to remove redundant visual information, or to provide less detail in the video image in order to reduce the number of digital bits required to represent and to reproduce the video frames. The video compression process consists a combination of lossless and lossy compression methods. Lossless compression methods remove temporal and spatial redundant information in the video image sequences by coding only the difference between the image pixels. The lossy compression methods exploit the insensitivity of human vision system to certain aspects of the video images so that the resulting visual impact of the lossy compression is minimized, yet still resulting in savings of digital bits.

A typically digital video compression process for the mass distribution of broadcast quality content produces a compressed bit stream having bit rates between 3 Mbps and 6 Mbps without significant loss of video quality when the bitstream is decompressed and displayed. Examples of such signals include DVD content, digital broadcast satellite digital cable services, and digital terrestrial television (TV) broadcast signals. The digital video compression process provides parameters and algorithms to produce an encoded, compressed video bitstream at a given bit rate and associated video quality. Specifically, the more compression that is applied to the video signal, the lower the resulting bit rate and video quality. This trade-off between bit rate and video signal distortion (as a result of the encoding process) is typically decided at the time of encoding.

A digital video service provider (hereinafter "service provider") may receive MPEG-2 digital video programming streams from satellites, real-time digital video program encoders, or video servers. These programming streams generally contain multiple bitstreams of compressed video, audio, and data streams all running at variable bit rates (VBRs). A variable bit rate video stream cannot be transferred and decoded for display at a continuous frame rate over a constant bit rate channel with a real-time decoder at the receiver end, the decoder having a prescribed finite buffer. These bitstreams are statistically multiplexed to form a single constant-bit-rate (CBR) stream or multiplex. As such, the bit rate of each constituent bitstream of a multiple bitstream multiplex depends upon the bit rates of the other bitstreams in the multiplex. For example, if one bitstream has a higher share of the total multiplex bandwidth, other bitstreams will correspondingly have an aggregate lower share of the multiplex bandwidth. The bandwidth allocation among different bitstreams is not static, but is dynamically adjusted over time, depending on the relative spatial and temporal image complexities of the coded video frames within each bitstream.

For the service provider to deliver digital video content to users, it is frequently necessary to adjust the bit rate of an encoded bitstream. For example, a service provider may want to extract certain programming streams from a multiplexed satellite-based source and provide the extracted programming streams to its users or customers. Specifically, when bitstreams are extracted from a statistical multiplex, they must be combined to form a new output bitstream multiplex. In this case, the peak bit rates of the various source streams could exceed the total fixed bit rate for the output bitstream and exceed the service provider's downstream communications channel capacity. Therefore, the bit rate of the source streams needs to be adjusted and remultiplexed to meet communications channel capacity constraints.

FIG. 1 is a block diagram of a conventional transrating multiplexer 100. The illustrated conventional transrating multiplexer 100 includes a first transrator 115, a second transrator 120, and a statistical multiplexer 125. The first transrator 115 receives as input a first input stream 105. The second transrator 120 receives as input a second input stream 110. The first and the second input streams 105, 110 represent conventional compressed digital video bitstreams formatted in, for example, MPEG-2 transport packets. The first and the second transrators 115, 120 provide output bitstreams to the statistical multiplexer 125. The first and the second transrators 115, 120 adjust the bit rate of the input streams 105, 110. Typically the first and the second transrators 115, 120 reduce the bit rate or produce no change to the bit rate of the input streams 105, 110. The statistical multiplexer 125 combines the output bitstreams into a constant bit rate (CBR) stream suitable for transport or delivery on a communications channel.

To control the output of the first and second transrators 115, 120, the statistical multiplexer 125 is coupled to the first and the second transrators 115, 120 via feedback paths 117, 122. The feedback paths 117, 122 include control signals that enable the statistical multiplexer 125 to adjust dynamically the bit rate of bitstreams produced by the first or the second transrators 115, 120. The bit rate adjustment is needed for the statistical multiplexer 125 to produce an output stream 130 that efficiently utilizes the channel bandwidth. That is, the bit rate of the bitstream generated by the first transrator 115 and/or the second transrator 120 may need to be adjusted to meet packet scheduling constraints imposed by multiplexing the bitstreams for transport over a fixed bandwidth channel.

With a conventional compressed digital video data format, such as MPEG-2, the bit rate of a bitstream cannot be adjusted by merely removing data from the bitstream. The decoding process needs all the data in the bitstream to produce a video sequence, and arbitrarily stripping bits from the bitstream yields incomplete information which results in decoding errors. There are several conventional techniques, however, to change or to reduce the bit rate of a compressed digital video bitstream. One conventional technique is to decode the bitstream, recalculate the motion estimation vectors, and then re-encode the bitstream at a reduced bit rate. Recalculation of motion estimation vectors uses substantial computing resources. FIG. 2 is a block diagram that illustrates another conventional transrating system that reuses the motion estimation vectors rather than recomputing them for the transrated bitstream.

In FIG. 2, a compressed video bitstream 205 is provided as input to an extract packet payload module 210. The extract packet payload module 210 removes system layer packet information of the bitstream and produces an elementary stream. The elementary stream is then provided as input to a variable length decode module 215. The variable length decode module 215 decodes the elementary stream to provide motion vectors 217 and to provide data to an inverse quantization module 220. The data then flows from the inverse quantization module 220 to the inverse discrete cosine transform module 225. The output of the inverse discrete cosine transform module 225 is provided as input to the motion compensation module 230. The motion compensation module 230 also receives the motion vectors 217 as input. A frame buffer 235 is optionally coupled to the motion compensation module 230. The frame buffer 235 can be used to present or to display the data for compensating for motion error as a result of reusing the motion vectors 217. The motion compensation module 230 provides output data to a discrete cosine transform module 240.

From the discrete cosine transform module 240, the data flows to the quantization module 245. The quantization module 245 applies a quantization scale factor that correlates with the target (transrated) bit rate. A variable length code encoder 250 receives the output from the quantization module 245. The variable length code encoder 250 provides data to a packetizer 255, which adds MPEG-2 packet structure to the data. The packetizer 255 produces as output the transrated video bitstream 260.

One problem with conventional digital video distribution systems is that a conventional transrating multiplexer 100 is needed to fill each fixed bandwidth channel that is provisioned for digital video delivery. Depending on the services offered or the service differentiation provided to users, several conventional transrating multiplexers 100 may be needed in a headend or near the point of transport over a fixed bandwidth channel.

Further, in typical digital video distribution systems the transrating and multiplexing functions need to be performed in real-time, which involves substantial computing resources. The conventional transrating multiplexer 100 therefore uses specialized or expensive hardware to meet real-time performance constraints. Because of the real-time nature of digital video delivery, the conventional transrating multiplexer 100 incorporates feedback paths 117, 122 to adjust dynamically the transrator output bit rate for high bandwidth utilization without adding significant delay to the constituent bit streams.

What is needed is a system and method for remultiplexing compressed digital video capable of near real-time operation, without the feedback paths or expensive hardware associated with a conventional transrating multiplexer.

SUMMARY OF THE INVENTION

An embodiment of the present invention separates the transrating operation from the statistical multiplexing functions. Specifically, a staging processor performs the transrating operation without direct feedback from the multiplexer. Program streams are segmented into discrete video segments. For each video segment several transrated versions may be generated. These transrated versions of the video segment are then packaged into a video block for further distribution on a transport network. In one embodiment, the video block is formatted in MPEG-2 transport stream format.

In another embodiment, the staging processor receives a plurality of bitstreams from receivers and generates video blocks for each of the programming bitstreams. These video blocks can be provided directly to a transport network or stored in a storage server for later retrieval.

In a further embodiment, a transprocessor includes a decoding portion and an encoding portion. The encoding portion includes multiple encoder outputs that can produce several output bitstreams. Each of the output bitstreams can have a different bit rate. One advantage of multiple encoder outputs is reduced complexity compared to having a separate transprocessor for each target output bit rate. In one embodiment, the transprocessor may reuse motion vectors to reduce further the computational load associated with transrating a bit stream. In a further embodiment, segmentation of the bitstream into video segments enables the transprocessor to perform transration on a segment-by-segment basis. That is, the transration target bit rate parameters may be adjusted independently for each video segment. The segmentation technique also serves to partition the originally continuous programming bitstream into data segments such that the resulting stream can be switched in and out of a separate video data stream.

In another embodiment, a bit rate switch selects among the video segments in a video block to determines the optimal video segment to place in the multiplex. The video segments may be comprised of MPEG-2 tranport packets so that the bit rate switch can select a video segment and interleave its packets into the multiplexed output without repacketizing or performing sub-transport packet processing.

Further features of the invention, its nature and various advantages will be more apparent from the accompanying drawings and the following detailed description.

BRIEF DESCRIPTION OF THE DRAWINGS

The accompanying drawings illustrate several embodiments of the invention and, together with the description, serve to explain the principles of the invention.

FIG. 4 is a block diagram of a staging processor according to one embodiment of the present invention.

FIG. 5 is an illustration of video segment extraction according to one embodiment of the present invention.

FIG. 6 is a block diagram of a transrating system according to one embodiment of the present invention.

DETAILED DESCRIPTION OF THE EMBODIMENTS

The present invention is now described more fully with reference to the accompanying figures, in which several embodiments of the invention are shown. The present invention may be embodied in many different forms and should not be construed as limited to the embodiments set forth herein. Rather these embodiments are provided so that this disclosure will be thorough and complete and will fully convey the invention to those skilled in the art.

A. System Overview

Figure 3:
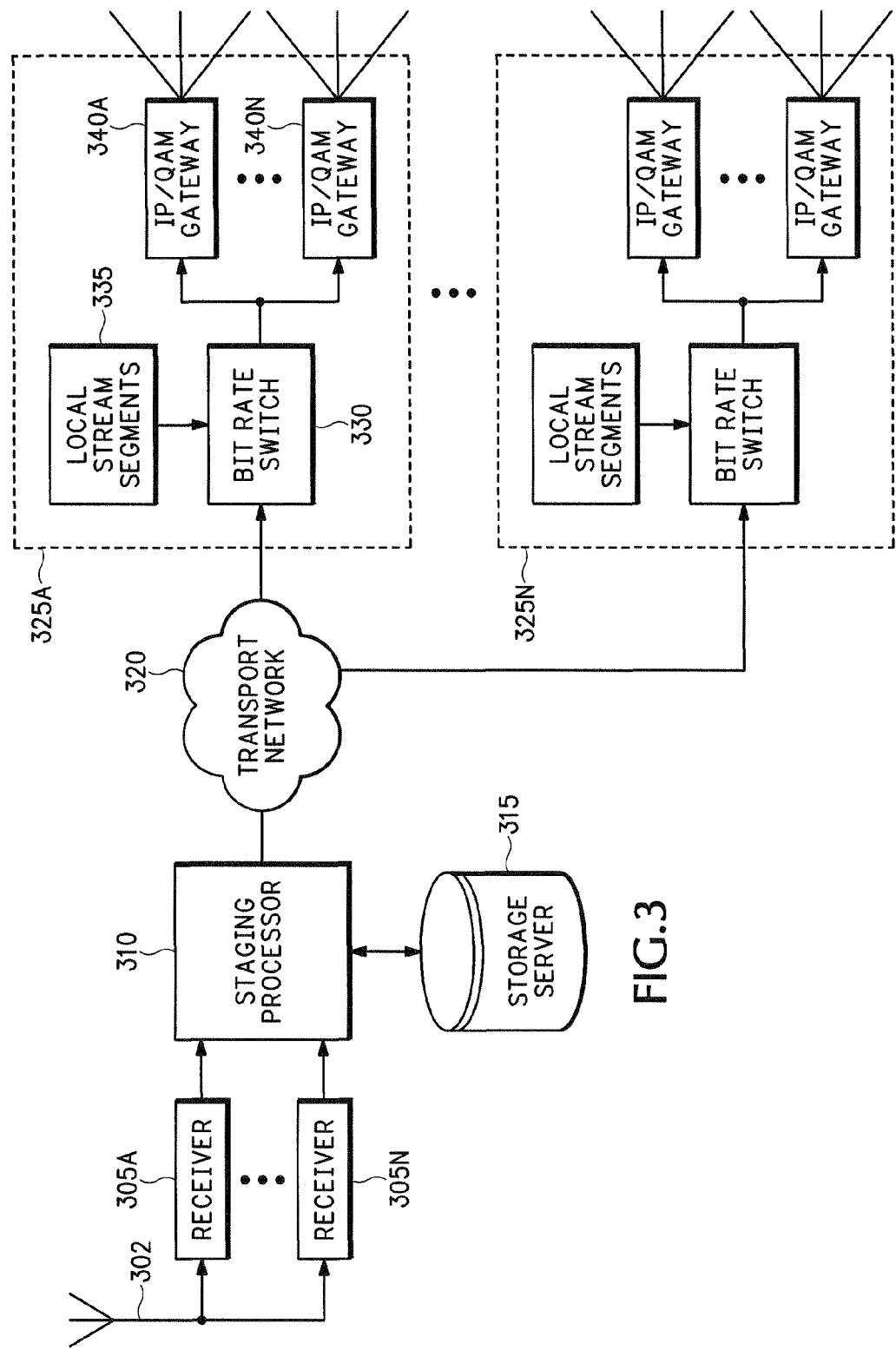
FIG. 3 is a block diagram of a content distribution system according to one embodiment of the present invention.

FIG. 3 is a block diagram of a content distribution system according to one embodiment of the present invention. FIG. 3 includes a receiver 305, a staging processor 310, a storage server 315, a transport network 320, and a distribution frame 325. For clarity of the following description, the components are generally referenced in the singular, although one skilled in the art will appreciate that the reference designators A to N are used indicate a functional or structural plurality of some of the components. The receiver 305 is configured to receive compressed digital video from a signal source 302. The signal source 302 represents, for example, a satellite broadcast, a terrestrial broadcast, or other content distribution network. In one embodiment, the receiver 305 includes a tuner to receive a digital signal that represents the audio and video bit streams associated with a single programming channel. The tuner can be configured to select the desired programming channel. In another embodiment, the receiver 305 includes an interface for receiving a plurality of programming channels from the signal source 302.

In one embodiment, the signal source 302 provides a plurality of programming signals in a statistically multiplexed transport stream. For example, a satellite transponder can transmit a multiplexed transport stream that includes video and audio programs for 10-20 broadcast networks. The receiver 305 decodes one or more variable bit rate (VBR) compressed bit streams from the multiplexed transport stream. The decoded bit stream is then provided as input bit stream to the staging processor 310.

The staging processor 310 manipulates the input bit stream. In one embodiment, the staging processor 310 performs transrating functions on a plurality of input bit streams. That is, the staging processor 310 can be used to adjust the bit rate of the input bit stream for downstream delivery. In another embodiment, the staging processor 310 directs one or more of the input bit streams to the storage server 315. The storage server 315 is configured to store the bit stream and to output stored bit streams for on-demand content delivery.

In one example digital video-on-demand application, the storage server 315 includes a large data capacity that can be used as a primary content library. The storage server 315 preferably includes hard disk drives for persistent storage, although optical or other storage techniques can be used.

Further details and exemplary functionality of the staging processor 310 are described below.

The staging processor 310 is coupled to a transport network 320. In one embodiment, the transport network 320 distributes content to several distribution frames 325. One example of a distribution frame 325 is a cable headend that serves a community. In another embodiment, the transport network 320 can be a wide area network in which the distribution frame 325 represents a regional content delivery point that serves many communities. One skilled in the art will appreciate that the system configuration shown in FIG. 3 applies to content distribution at several granularities. For example, the transport network 320 and the distribution frame 325 can be scaled to various configurations depending on the needs of the users or content services provided.

The distribution frame 325 includes a bit rate switch 330, local stream segments 335, and an Internet Protocol (IP)/Quadrature Amplitude Modulation (QAM) Gateway 340. The bit rate switch 330 receives content from the staging processor 310 over the transport network 320. The bit rate switch 330 multiplexes the content for transport to downstream users or subscribers. The bit rate switch 330 ensures that the total output bit rate does not exceed the constraints of the communications channel. More specifically, the bit rate switch 330 selects a video segment that is encoded at an appropriate bit rate in order to fill the communications channel. For example, in a cable distribution channel, a QAM-256 modulated communications channel can carry 38.4 Mbps of data. The IP/QAM gateway 340 is a conventional device that can receive digital data and modulate that data for distribution in a communications channel. In one embodiment, the IP/QAM gateway 340 includes an Ethernet network interface that is coupled to the bit rate switch 330. The IP/QAM gateway 340 is typically coupled to a distribution network that extends to the user.

In one embodiment of the present invention, the bit rate switch 330 can incorporate local stream segments 335 into the output stream. The local stream segments 335 typically represent commercial advertisements that are inserted into a video broadcast. The local stream segments 335 can be, for example, commercial segments that users of a particular distribution frame 325 are interested in. More specifically, the local stream segments 335 can include advertisements that have user, local, or regional appeal. The scale or granularity of the distribution frame 325 can be used to determine the scope of the local stream segments 335.

B. Staging Processor

The staging processor 310 is now described in further detail. FIG. 4 is a block diagram of a staging processor according to one embodiment of the present invention. In the illustrated embodiment, the staging processor 310 includes an input module 405, an analyzer module 410, a separator module 415, a transprocessor module 420, a formatter module 425, an output module 430, and a buffer 450. Each of these functional modules can be implemented with one or more conventional computing devices. For example, an Intel Pentium 4 platform running the Linux operating system can be configured to perform the features or functions of the staging processor 310.

In one embodiment, the input module 405 includes a DVB-ASI or DHEI interface for communicating with the receiver 305. Of course, the input module 405 can also include Ethernet or other digital interfaces. The compressed video program data passed from the input module 405 includes multiplexed digital video programs. In one embodiment, each of the video programs is encoded with variable bit rate.

The analyzer module 410 obtains information from the input bitstream, and uses the information to decompose the bitstream for subsequent processing. In one embodiment, the bitstream is in MPEG-2 transport stream format. One skilled in the art will appreciate, however, that other formats, such as MPEG-1 and MPEG-2 program streams, MPEG-4, H.264, Real, Quicktime, Windows media, can be similarly processed.

The analyzer module 410 parses out information from the bitstream. In one embodiment, the following information is obtained from the bitstream: PCR, PTS/DTS, picture coding type, size of coded picture in number of bytes (measured by access units, as defined by the MPEG specification), average quantization scale, average motion vector size, number of bits used by DCT coefficients per coded picture, and packet schedule profile. An example packet schedule profile is further described in the U.S. patent application Ser. No. 10/339, 742, entitled "Packet schedule timestamp for a compressed bitstream," filed Jan. 9, 2003.

The analyzer module 410 then passes the parsed information on to the separator module 415. The separator module 415 performs segmentation of the bitstream using the information about the bitstream obtained by the analyzer module 410.

The separator module 415 extracts the elementary payload from the input bitstream and partitions the resulting payload into separate data units. In one embodiment, the elementary stream (ES) payload is partitioned along coded pictures and/or group of coded pictures (GOP) boundaries. A GOP is typically defined as the group frames from I-type frame to I-type frame, non-inclusive of the succeeding I-type frame. That is, a group of frames beginning with an I frame and ending with the frame preceding the next I frame. The resulting partitions or segments of frames are defined as video segments (video segment). Each video segment represents a collection of video coded pictures that are processed as a unit in subsequent stages. Depending on the processing capability and requirement, each video segment can be a GOP or simply a coded picture of I, P or B type. For example, the granularity required by the bit rate switch 330 can be used to determine the size of the video segment.

The separator module 415 then analyzes the bit rate characteristics of each video segment. The separator 415 determines the number of bits in each video segment (i.e., size of the video segment), the timing information about each video segment (PCR/PTS/DTS) and the bit rate information. Depending on the bit rate of the video segment, the separator module 415 provides the video segment to the transprocessor module 420. In one embodiment, a video segment is transrated into multiple video segments having different bit rates. The bit rate switch 330 performs a multiplexing function and selects a video segment that is encoded at an appropriate bit rate in order to meet communications channel capacity constraints.

If the bit rate of the video segment is low, the need for further bit rate reduction is low or none, in this case, the video segment is passed through to the formatter module 425. However, if the bit rate of the video segment is high, its share of the overall communications channel bandwidth is likely to be high and bit rate reduction is performed. In this case, the video segment is provided to the transprocessor module 420 for bit rate reduction through a transrating operation.

In one embodiment, the formatter module 425 receives an input bit stream and formats the input bit stream into transport packets. For example, the separator module 415 and the transprocessor module 420 can output MPEG-2 elementary stream packets that the formatter module 425 configures into an MPEG-2 transport stream packet structure.

FIG. 5 is an illustration of video segment extraction according to one embodiment of the present invention. FIG. 5 includes a transport packet 505 and several video segments 510, 515, 520, 525. An elementary stream payload 507 is included within the transport packet 505. More specifically, in the MPEG-2 transport stream format, a fixed number of bits is typically allocated to the elementary stream payload 507. In one embodiment, the transprocessor 420 generates multiple video segments with each video segment representing the same program content encoded at different bit rates. The multiple video segments 510, 515, 520, 525 are represented by a variable number of bits, which can exceed the capacity of the payload 507 of a single transport packet 505. Therefore, the video segments can be partitioned into several payloads 507 that span across transport packet 505 boundaries.

Further, in FIG. 5, the transport stream (TS) header 530, packetized elementary stream (PES) header 532, and elementary stream (ES) payload 507 represent a hierarchical view of the different headers and data fields of the transport packet 505. The TS header 530 begins the transport packet 505 for which the PES header 532 and ES payload 507 represent the payload. Further, the PES header 532 begins the PES packet which contains the ES payload 507 as data of the PES packet. The PES packet, however, may be larger then the payload of a single transport packet 505. Multiple transport packets 505 therefore may be used to contain data from a single PBS packet. Reformatting of the video segments into integer numbers of transport packets is further described below and with reference to FIG. 8.

The formatter module 425 provides its output to the output module 430. The output module 430 can buffer the output as needed for distribution to the transport network 320. Further, as described in one embodiment above, the output module 430 can be coupled to a storage server 315 for storing data. In this case, the input module 405 interfaces with the storage server 315 for retrieving data. This configuration enables the staging processor 315 to retrieve compressed digital video data from the storage server 315, process the data, and then store the processed result in the storage server 315.

The formatter module 425 advantageously enables the bit rate switch 330 to operate at the transport packet level, rather than performing sub-packet level processing. That is, when the bit rate switch 330 selects a video segment to include in the statistical multiplex, the transport packets can be provided to the multiplexed output without further sub-packet level processing. Of course, one skilled in the art will appreciate that transport packet level processing, such as modifying or adjusting timestamps may be needed to ensure proper decoding and/or presentation of the program content for the user.

In one embodiment, the transprocessor module 420 receives a bit stream as input and generates a plurality of output bitstreams, each of the output bitstreams having a different bit rate. In another embodiment, the transprocessor module 420 provides a single bitstream output. The single bitstream output can have the same or a different bit rate as the input bitstream. In this case, several instances of the transprocessor module 420 can be used to generate bitstreams having multiple bit rate outputs.

The buffer 450 is provided as storage for the functional modules of the staging processor 310. In one embodiment, the staging processor 310 is implemented using one or more conventional computing devices that are not necessarily specially equipped for real-time video processing. Although one skilled in the art will appreciate that real-time hardware can be used in an embodiment of the present invention, cost savings can be realized by using conventional computing devices. For instance, when a user requests content that has already been processed by the staging server 310 and stored in the storage server 315, there is little need for the staging processor 310 to be able to perform real-time transrating. However, when a user requests content that is currently being received by the receiver 305, then the user may experience a delay because of the non-real time nature of one embodiment of the staging processor 310. More specifically, the user may experience a small delay before a live broadcast program starts to be displayed on the user's display. The duration of the delay correlates to the speed at which the staging processor 310 can generate multiple video segments at the throughput needed to sustain continuity of the bitstream at the user's set-top box, receiver, or display device.

C. Transprocessor

Figure 1:
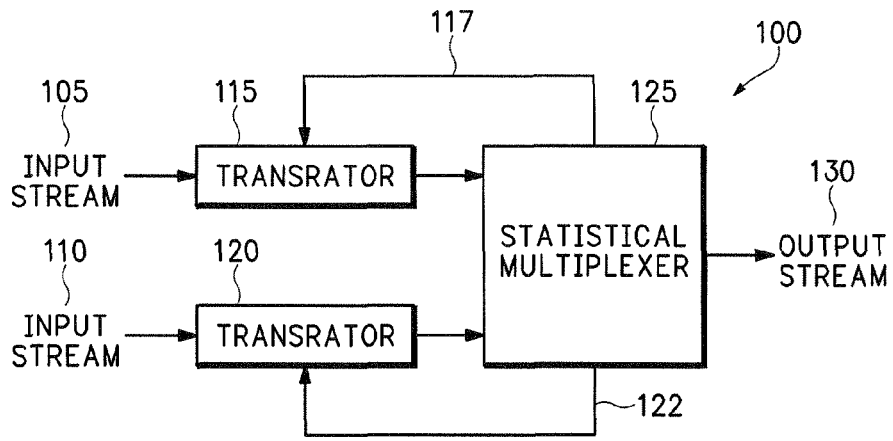
FIG. 1 is a block diagram of a conventional transrating multiplexer.
Figure 2:
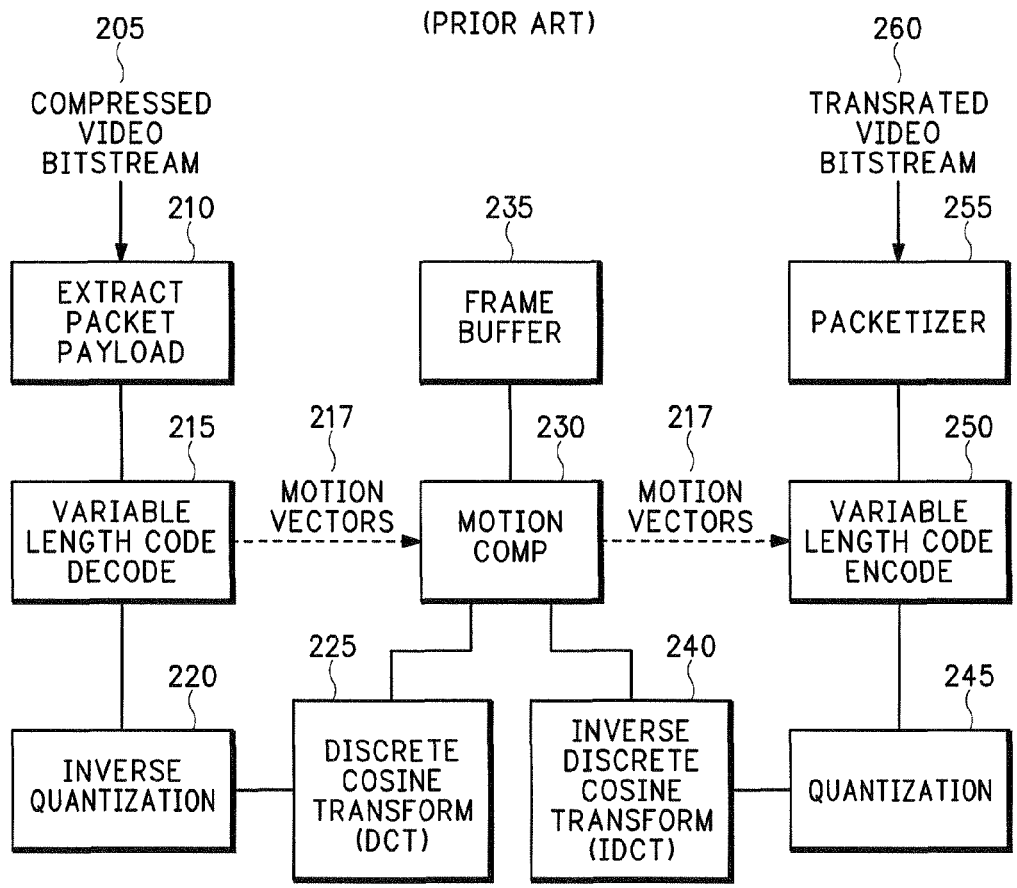
FIG. 2 is a block diagram of a conventional transrating system.

FIG. 6 is a block diagram of a transrating system according to one embodiment of the present invention. The illustrated system generally includes two portions: the first portion performs the decoding process and the second portion performs the encoding process. The decoding process includes conventional elements of extracting elementary stream payload, seeking out the syntax header bits, decode variable length codes, performing inverse quantization, performing inverse DCT transform and motion compensation. One conventional decoding process is described above and with reference to FIG. 2. The second portion performs the inverse of the first portion: DCT transform, quantization, variable length encode, and packetization.

In the illustrated embodiment of the present invention, however, the second portion includes multiple encoder outputs 610, 620, 630, 640 for generating multiple output bitstreams concurrently. For each of the encoder outputs 610, 620, 630, 640, the quantization scale factor can be configured to produce a bit stream having a desired bit rate. The use of multiple encoder outputs 610, 620, 630, 640 substantially reduces the complexity of producing multiple bit rates for a given video segment. In one embodiment, the transprocessor 420 conventionally reuses motion vectors to reduce further the computational load associated with transrating a bit stream.

The transprocessor 420 is further adaptive depending on the type of video segment provided as input. For example, if individual coded pictures of I type form a video segment, the transrating process need only perform a requantization to achieve bit rate reduction. In this case, motion compensation and frame buffering are not needed.

The quantization scale factor is the step size used to quantize the DCT coefficients. The selection of the quantization scale factor largely determines the number of bits used to represent the coded picture, and therefore, the resulting bit rate. The quantization factor is an adjustable value that can vary from macroblock to macroblock. As a result, control of the bit rate can be achieved through the adjustment of the quantization scale factors.

The rate controls can be individually applied to each of the encoder outputs 610, 620, 630, 640. In one embodiment, the output of each of the encoder outputs 610, 620, 630, 640 is provided to the formatter 650. The formatter 650 captures each of the output video segments having different bit rates and stores these video segments in a video block as described in further detail below and with respect to FIG. 7.

In one example implementation the bit rate is reduced progressively, by a fixed percentage, or fixed decrement, for each of the output video segments. For example, if the input video segment has a bit rate of 8 Mbps, then four output video segments are generated, each at a different bit rate. In this case, the output video segments may have bit rate of 7 Mbps, 6 Mbps, 5 Mbps, and 4 Mbps. In another case, the output video segments may have a 10% bit rate reduction: 7.2 Mbps, 6.48 Mbps, 5.83 Mbps, and 5.25 Mbps, respectively. Of course, it is also convenient to use the coded segment data size as the basis for reduction, instead of the bit rate. One skilled in art will also appreciate that the number of video segments generated can depend on the requirements the distribution frame 325 and/or the bit rate switch 330. For example, in a system with a high number of users in each distribution frame 325, it may be desirable to have 8 video segments generated for more efficient multiplexing of the video segments into the downstream communications channel.

D. Formatter

Figure 7:
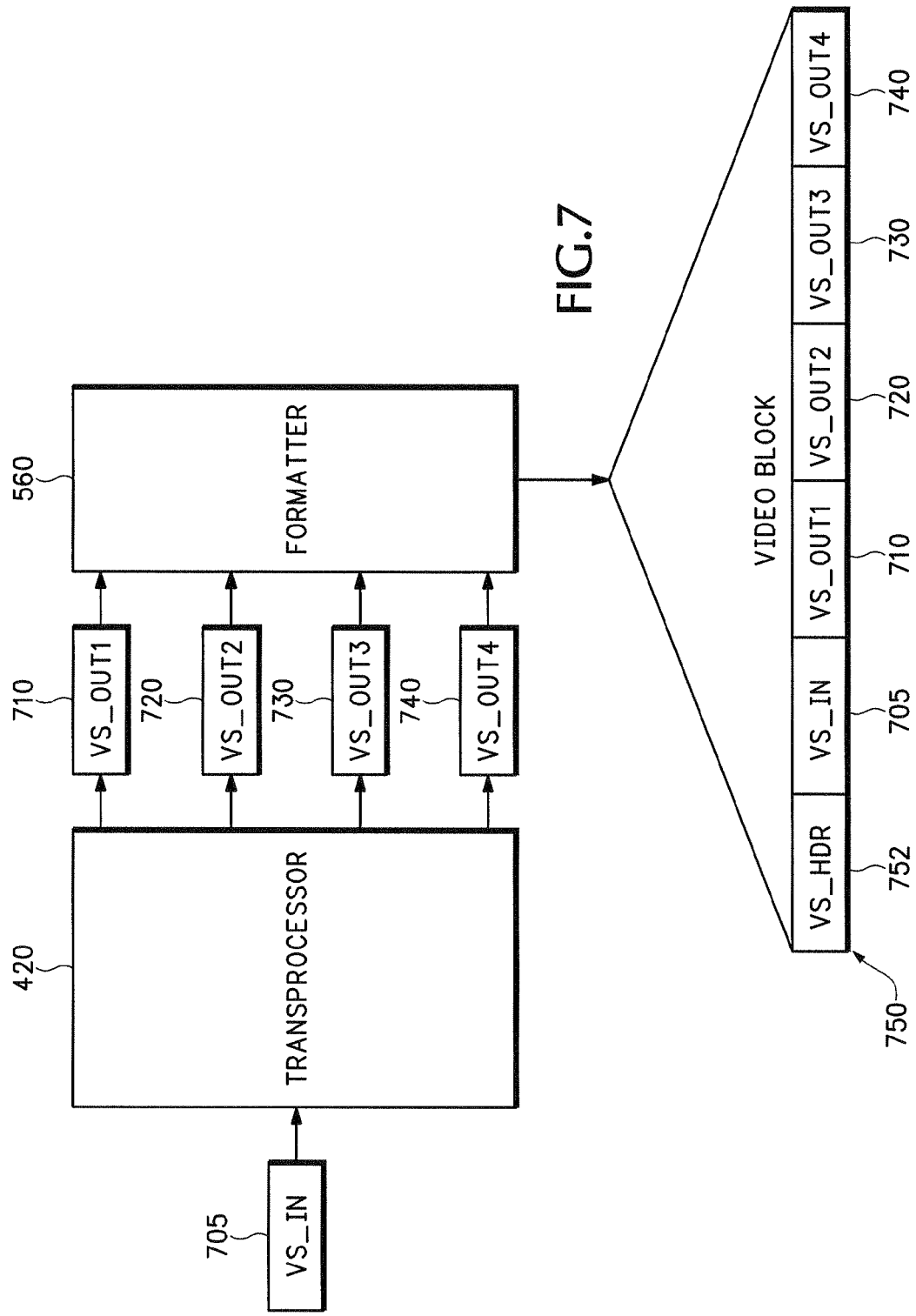
FIG. 7 is an illustration of a video block according to one embodiment of the present invention.

FIG. 7 is an illustration of a video block according to one embodiment of the present invention. As described above, the transprocessor 420 performs transrating functions on an input video segment 705. In one embodiment, the transprocessor 420 produces multiple video segments 710, 720, 730, 740. In the illustrated embodiment, the video segments 710, 720, 730, 740 correlate to the encoder outputs 610, 620, 630, 640. Although the illustrated embodiment includes 4 encoder outputs 610, 620, 630, 640 and corresponding video segments 710, 720, 730, 740, one skilled in the art will appreciate that fewer or more video segments can be generated depending, for example, on the requirements of the bit rate switch 330 to fill the multiplex. The video segments 710, 720, 730, 740 are provided as input to the formatter 650. The formatter 650 incorporates the video segments into a video block 750. The video block 750 is a data structure that includes the input video segment 705, the video segments 710, 720, 730, 740, and a video block header 752.

The video block header 752 generally provides information about the bitstream and describes the layout of the video segments 710, 720, 730, 740 for downstream processing. More specifically, when video segments are packaged end-to-end within the video block 750, the video block header 752 includes offset information so that the bit rate switch 330, for example, can easily seek the needed video segment from the video block 750.

Further the video block header 752 can include other information (or metadata) that is useful for downstream processing or implementing various video delivery features. For example, the video block header 752 can indicate the length in number of bytes for each of the video segments contained in the video block 750, as well as the total length in number of bytes for this entire video block 750; the bit rate and bit usage value for each of the video segment contained in the video block 750; compression statistics of each of the video segments 705, 710, 720, 730, 740; look ahead packet schedule information for each of the video segments; timestamps for each video segment; or metadata required for indexing (VCR controls) and content management.

Compression statistics can assist the bit rate switch 330, for example, in normalizing the video quality for the communications channel across each of the programming streams that are being statistically multiplexed. Timestamps can utilize the network time protocol (NTP) so that they can be later used by the requesting client or user to determine the time at which the content is received. Look ahead packet schedule information can indicate statistics for video blocks 750 that can be provided to a processing device such as the bit rate switch 330 ahead of the arrival of the video block described by the statistics. For example, the look ahead packet schedule typically provides the bit rate switch 330 with bit rate profiles for several seconds of video blocks 750. The bit rate switch 330 can then use this information to perform a more efficient switching operation, which results in better bandwidth utilization. Look ahead packet scheduling is further described in the U.S. patent application Ser. No. 10/339,742, entitled "Packet schedule timestamp for a compressed bitstream," filed Jan. 9, 2003, the relevant portions of which are incorporated herein by reference. In one embodiment, the formatter 650 generates the video block header 752 in MPEG-2 transport format (i.e., 188 Bytes).

One skilled in the art will note that if the bit stream analyzer module 410 determines that no transrating is necessary for the input video segment 705, then the video block 750 only includes the input video segment 705 and corresponding video block header 752. That is, the input video segment 705 need not be replicated multiple times to fill the video block 750. One benefit of this technique is conservation of storage space and/or transport bandwidth when transrating of the input video segment 705 is not required.

Figure 8:
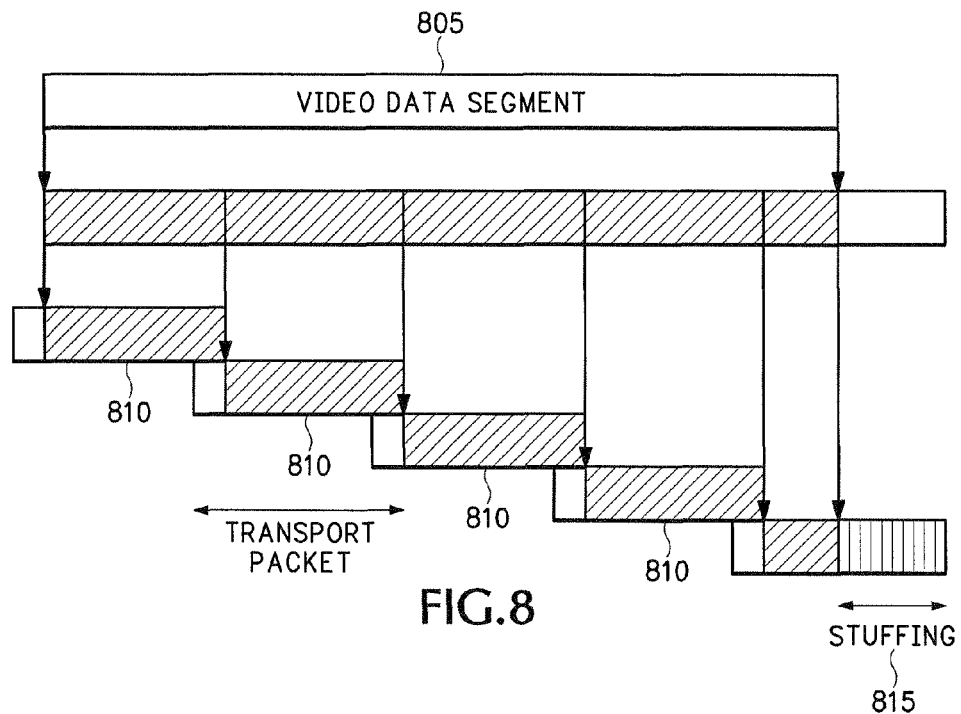
FIG. 8 is an illustration of video segment formatting according to one embodiment of the present invention.

In an embodiment, the video segments within the video block 750 are formatted in MPEG-2 transport stream format. This enables the bit rate switch 330 or other processing devices to select video segments and multiplex the corresponding packets for delivery without performing additional packetizing or stream extraction. FIG. 8 is an illustration of video segment formatting according to one embodiment of the present invention. In the illustrated embodiment, a video segment 805 spans multiple transport packet payloads 810. The video segment 805 is therefore partitioned into an integer number of transport packet payloads 810. Because each video segment can vary in size, the video segment does not likely fit precisely into an integer number of transport packet payloads 810. In this case, stuffing bits 815 can be added to complete a partially filled transport packet payload 810. In the MPEG-2 transport stream format, stuffing bits 815 can be used without violating the protocol syntax. In one embodiment of the present invention, the stuffing bits 815 are implemented with an adaptation field extension within the MPEG-2 protocol.

Of course, the stuffing bits 815 add overhead or inefficiency to the content delivery system because some transport packet payloads 810 are not being fully utilized. One skilled in the art will appreciate that the inefficiency here depends on the granularity of the video segment. For example, in one embodiment, the video segment is partitioned at the group of coded pictures (GOP) level. In this case, stuffing bits 815 may be required once for each GOP. For a typical encoded video bitstream, the GOP occurs once every 15 coded video frames, or approximately twice per second for NTSC format video signals (i.e., presentation rate of 30 frames per second). On average the stuffing bits 815 consume about half of the 184 byte transport packet payload 810, the average inefficiency is 92 bytes per video segment. For MPEG-2 video encoded at 4 Mbps, this equates to an approximate inefficiency of about 0.04%, which is insignificant loss of efficiency.

If the bit rate switching is to occur at more granularity (i.e., smaller video segments), the inefficiency due to stuffing bits 815 may insignificantly increase. The benefit of increasing granularity, on the other hand, is also significant as it increases the efficiency of the statistical remultiplexing as it allows for more granularity of the video segment selections from the video blocks.

Figure 10:
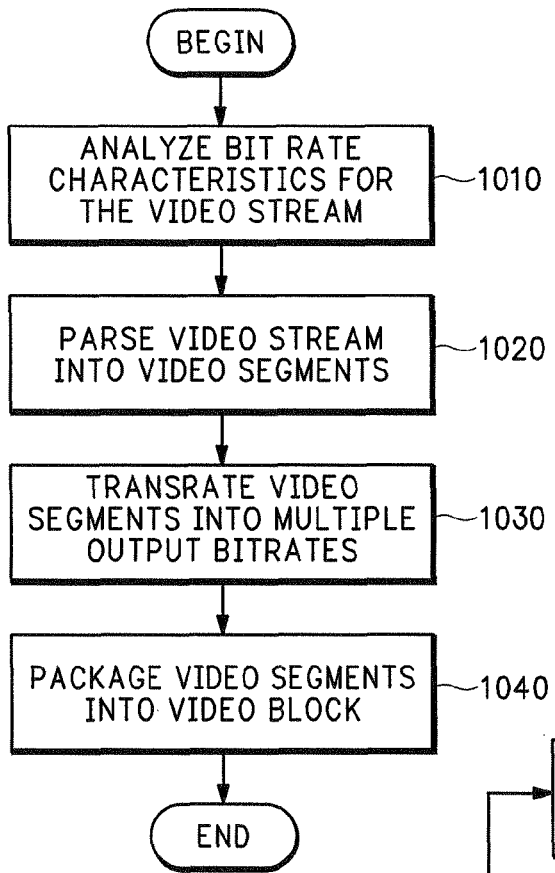
FIG. 10 is a flowchart illustrating a method for creating video blocks according to one embodiment of the present invention.

FIG. 10 is a flowchart illustrating a method for creating video blocks according to one embodiment of the present invention. In the illustrated embodiment, the staging processor 310 begins by analyzing 1010 the bit rate characteristics for the video stream. The staging processor 310 then parses 1020 the video stream into video segments. More specifically, the staging processor 310 identifies the size or grouping of the coded pictures that comprises a video segment. The video segment is then transrated 1030 into multiple video segments, in which each video segment has a different bit rate. The different bit rate video segments enable the bit rate switch 330 to subsequently select a video segment having an appropriate bit rate for multiplexing into a CBR communications channel. Each of the transrated video segments are packaged 1040 into a video block that can be delivered to one or more distribution frames 325. Each video segment within the video block includes the same portion of the programming content encoded at different bit rates.

E. Bit Rate Switch

Figure 9:
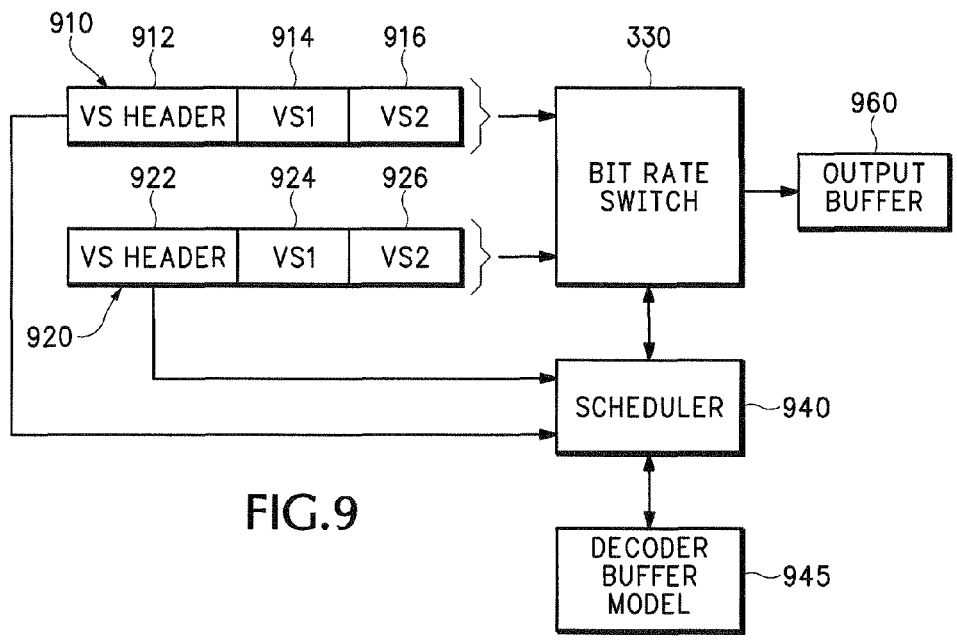
FIG. 9 is a block diagram illustrating bit rate switching according to one embodiment of the present invention.

FIG. 9 is a block diagram illustrating bit rate switching according to one embodiment of the present invention. The illustrated embodiment includes a first video block 910, a second video block 920, a bit rate switch 330, a scheduler module 940, a decoder buffer model 945, and an output buffer 960. The first video block 910 includes a video block header 912, a first video segment 914, and a second video segment 916. Similarly, the second video block 920 includes a video block header 922, a first video segment 924, and a second video segment 926. For the first video block 910, the video segments 914, 916 may have bit rates of 4 Mbps and 2 Mbps respectively. For the second video block 920, the video segments 924, 926 may have bit rates of 5 Mbps and 3 Mbps respectively.

In an embodiment of the present invention, the bit rate switch 330 performs multiplexing functions by selecting a video segment from the video block associated with a program stream or programming channel. As described above, the bit rate switch 330 ensures that the total output bit rate does not exceed the constraints of the communications channel. More specifically, the bit rate switch 330 selects a video segment that is encoded at an appropriate bit rate in order to fill the communications channel. The bit rate switch 330 determines which video segment to select based on the bit rate demands of the other concurrent programming streams. The selected video segment comprises transport packets that are interleaved with the transport packets of other concurrent programming streams. The multiplexed transport packets are then passed to the output buffer 960, which provides the data to the communications channel at a constant bit rate.

In one embodiment, the bit rate switch 330 is a large storage device that includes multiplexing functionality. In one example implementation, the storage of the bit rate switch 330 includes a large collection of electronic memory devices (e.g., DRAMs). The bit rate switch 330 can also include a conventional processor for performing multiplexing tasks, handling user requests for content, and delivering content to users. In the illustrated embodiment, the scheduler 940 is coupled to and provides a control input to the bit rate switch 330. The scheduler 940 performs an analysis on the video block headers 912, 922 associated with the video blocks 910, 920. The video block headers 912, 922 include information about the bit rate for each of the video segments included in the video block 910, 920. The scheduler 940 uses the bit rate information and the decoder buffer model 945 to determine which of the video segments to select for the multiplexing. The decoder buffer model 945 is used to address decoder performance issues, such as buffer overflow and underflow. For each of the programming bitstreams, the decoder buffer model 945 includes a state machine that models the current state of the decoder buffer. The scheduler 940 uses the state information to ensure that the video segments selection does not underflow or overflow the decoder buffer.

Using input from the scheduler 940, the bit rate switch 330 selects a video segment encoded at an appropriate bit rate from each of the video blocks 910, 920. Although only two video blocks are illustrated for two programming streams, one skilled in the art will appreciate that the bit rate switch 330 typically selects a video segment from many more video blocks that are associated with different programming streams. The bit rate switch 330 ensures that the output total bit rate fits close to the overall available channel bandwidth of the IP/QAM gateway 340. In a distribution frame 325 for a cable network, the cable distribution channels are frequency slotted into 6 MHz slots, in which each can carry data payload of 38.4 Mbps using QAM-256 modulation. In this case, each 6 MHz QAM modulated data channel can carry multiple compressed video programs, through the statistical multiplexing process.

Figure 11:
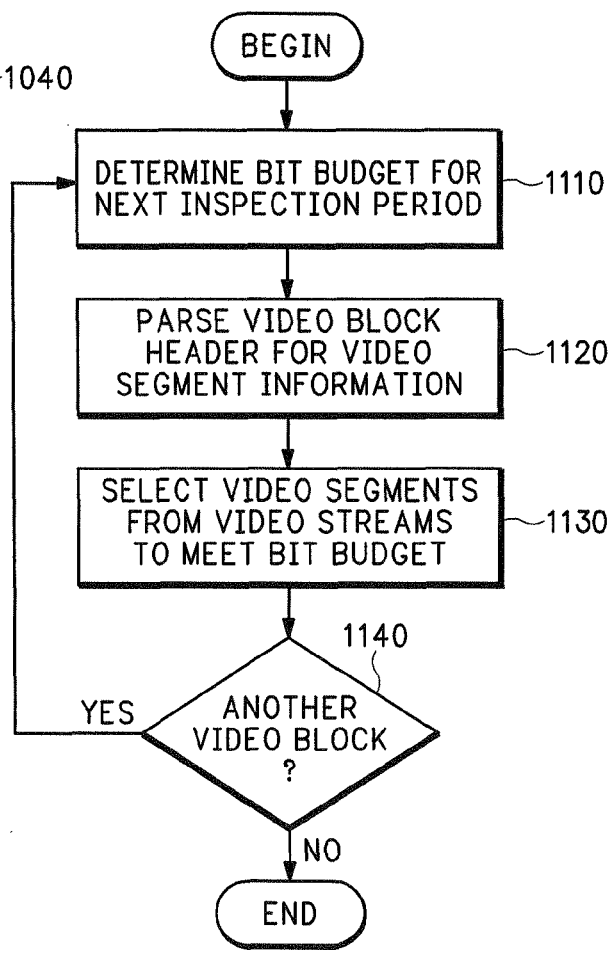
FIG. 11 is a flowchart illustrating a method for statistically multiplexing video blocks according to one embodiment of the present invention.

FIG. 11 is a flowchart illustrating a method for statistically multiplexing video blocks according to one embodiment of the present invention. The illustrated method begins with determining 1110 the bit budget for the next inspection period. The bit budget correlates to channel capacity that is available for the inspection period. After the bit budget is determined, video block headers 912, 922 are parsed 1120 for video segment information. The video segments are selected 1130 to meet the bit budget constraints. For example, if the bit budget is 7 Mbps, the first video segment 914 of the first video block is selected in combination with the second video segment 926 of the second video block. Given the example bit rates above, this selection fully utilizes the 7 Mbps of available channel capacity for the inspection period. If there are more video blocks 1140 then the process repeats at step 1110 by determining the bit budget for the next inspection period.

In statistical multiplexing, each video program or program stream may have VBR, but the aggregate total is CBR because communications channels are CBR. The bit rate switch 330 advantageously selects among the different bit rate video segments for each video program so that the resulting total bit rate fits into the total bandwidth or capacity of the communications channel. Although the video segments are generally transrated into video segments having discrete, fixed bit rates, rather than being transrated in real-time depending on the needs of the statistical multiplexer, the bit rate switch 330 can obtain high bandwidth utilization using only a few transrating granularities.

For example, a VBR programming stream having a bit rate of 3 Mbps yields acceptable quality display. In a 38.4 Mbps communications channel carrying multiple compressed video programs, about 13 programs can be transported at approximately 3 Mbps. If a granularity of 3 additional transrating copies per video program is used at a fixed 300 Kbps bit rate increment per video segment, the resulting bit rates of each program, on average, are about, 2.65 Mbps, 2.35 Mbps, 2.05 Mbps. Therefore, when 13 such VBR video programs are multiplexed together by the bit rate switch 330, the bandwidth efficiency can be close to that of a conventional transrating multiplexer. Specifically, the loss of bandwidth efficiency is generally less than the bandwidth increment of 300 Kbps in this case. Thus the bandwidth inefficiency averages about 0.3/38.4, which is about 0.8%.

One skilled in the art will appreciate that the bit rate switch 330 selects the video segments from the corresponding video blocks dynamically because of the VBR nature of the individual video bit streams. In addition, the video segments are switched into the output multiplex only at the boundaries of the video segments. Therefore, video segments from different programs may not generally align in time, as a result, the scheduler 940 compensates for this when selecting the video segments. Furthermore, given that a video segment can be GOP based, coded picture based, slice-based, or based on some other data unit, the bit rate switch 330 can adapt to switch the video segments at the frequency dictated by the size or division of the video segments.

As described above in one embodiment, the video segments are delineated on GOP boundaries. In another embodiment, frame boundaries can be used to delineate the video segments. This can increase the granularity of the switching and allowing better control over the overall available bit rate. In a further embodiment, the bit rate switch 330 can perform the switching within the coded pictures, which further increases the number of bit rate switching opportunities and thus the granularity of the switching. Although increasing the granularity of the video segments may provide more precise scheduling of the multiplex, increased granularity uses additional computation overhead because of more frequent switching. Further bit rate switching within the coded picture may cause noticeable visual differences on the user's display.

Having described embodiments of statistical remultiplexing of compressed video segments (which are intended to be illustrative and not limiting), it is noted that modifications and variations can be made by persons skilled in the art in light of the above teachings. It is therefore to be understood that changes may be made in the particular embodiments of the invention disclosed that are within the scope and spirit of the invention as defined by the appended claims and equivalents.

The invention claimed is:

1. A method, comprising:
providing a plurality of video blocks for at least one of a plurality of bitstreams, each video block including a plurality of video segments and each video segment including a plurality of frames;
determining a bit budget during an inspection period for the at least one of the plurality of bitstreams;
parsing a header included in a video block corresponding to the at least one of the plurality of bitstreams to determine a plurality of bit rates used to encode a corresponding plurality of video segments included in the video block;
selecting a video segment from the plurality of video segments included in the video block after parsing the header based at least in part on selecting a bit rate from the plurality of bit rates corresponding to the video segment that most substantially meets the bit budget; and
providing the video segment selected from the plurality of video segments included in the video block to an output buffer;
wherein each of the plurality of video segments included in the video block is independently decodable;
wherein each video segment included in the video block includes a same portion of content as other plurality of video segments in the video block; and
wherein each of the video segments comprises a bit rate different than a bit rate used to encode other of the plurality of video segments.

2. The method of claim 1, further comprising scheduling the video segment selected from the plurality of video segments included in the video block to fill a capacity of a communications channel.

3. The method of claim 1, further comprising modeling a decoder buffer to avoid an underflow condition or an overflow condition.

4. The method of claim 1, wherein the video segment selected from the plurality of video segments included in the video block comprises a local stream segment.

5. The method of claim 1, further comprising selecting the video segment from the plurality of video segments included in the video block in response to bit rate demands of concurrent bitstreams.

6. The method of claim 1, further comprising providing the video segment selected from the plurality of video segments included in the video block to a communications channel at a constant bit rate.

7. An apparatus, comprising:
a circuit configured to determine a bit budget for a plurality of bitstreams during an inspection period
a circuit configured to parse a header included in a video block associated with at least one of the plurality of bitstreams to determine a plurality of bit rates used to encode a corresponding plurality of video segments included in the video block wherein each video segment includes a plurality of frames;
means for selecting a video segment from the plurality of video segments included in the video block based at least in part on selecting a bit rate form the plurality of bit rates corresponding to the video segment that most substantially meets the bit budget; and
means for providing the video segment selected from the plurality of video segments to a communications channel;
wherein each of the plurality of video segments included in the video block is independently decodable;
wherein each video segment included in the video block includes a same portion of content as other plurality of video segments in the video block; and
wherein each of the video segments comprises a bit rate different than a bit rate used to encode other of the plurality of video segments.

8. The apparatus of claim 7, further comprising means for scheduling the video segment selected from the plurality of video segments included in the video block to fill a capacity of the communications channel.

9. The apparatus of claim 7, further comprising means for modeling behavior of a decoder buffer to avoid an underflow condition or an overflow condition.

10. The apparatus of claim 7, wherein the video segment selected from the plurality of video segments included in the video block comprises a local stream segment.

11. The apparatus of claim 7, further comprising means for selecting the video segment from the plurality of video segments included in the video block in response to bit rate demands of concurrent bitstreams.

12. The apparatus of claim 7, further comprising means for providing the video segment selected from the plurality of video segments included in the video block to a communications channel at a constant bit rate.

13. An apparatus, comprising:
a scheduler configured to determine a bit budget during an inspection period for at least one of a plurality of bitstreams, the at least one of the plurality of bitstreams comprising a plurality of video blocks, wherein each of the plurality of video blocks comprise a header and a plurality of video segments wherein each video segment includes a plurality of frames;
a processor configured to;
parse the header included in at least one of the plurality of video blocks to determine a plurality of bit rates corresponding to the plurality of video segments included in the at least one of the plurality of video blocks; and
select a video segment from the plurality of video segments based at least in part on selecting a bit rate form the plurality of bit rates corresponding to the video segment that most substantially meets the bit budget; and
an output buffer configured to store the video segment selected from the at least one of the plurality of video segments;
wherein each of the plurality of video segments included in the video block is independently decodable;
wherein each video segment included in the video block includes a same portion of content as other plurality of video segments in the video block; and
wherein each of the video segments comprises a bit rate different than a bit rate used to encode other of the plurality of video segments.

14. The apparatus of claim 13, wherein the scheduler is further configured to determine the bit budget to fill a capacity of a communications channel.

15. The apparatus of claim 14, wherein the scheduler is further configured to determine the bit budget to avoid an underflow condition or an overflow condition.

16. The apparatus of claim 13, wherein the processor is further configured to add a local stream segment to the video segment selected from the plurality of video segments included in the at least one of the plurality of video blocks.

17. The apparatus of claim 13, wherein the processor is further configured to select the video segment from the plurality of video segments included in the at least one of the plurality of video blocks in response to bit rate demands of concurrent bitstreams.

18. The apparatus of claim 13, wherein the output buffer is further configured to provide the video segment selected from the plurality of video segments included in the at least one of the plurality of video blocks to a communications channel at a constant bit rate.

* * * * *

UNITED STATES PATENT AND TRADEMARK OFFICE
CERTIFICATE OF CORRECTION

PATENT NO. : 8,437,389 B2  
APPLICATION NO. : 12/902845  
DATED : May 7, 2013  
INVENTOR(S) : Zhang et al.

Page 1 of 1

It is certified that error appears in the above-identified patent and that said Letters Patent is hereby corrected as shown below:

On the Title Page, under "Assistant Examiner", in Column 2, Line 1, delete "Jeremaiah" and insert -- Jeremiah --, therefor.

In the Drawings

In Fig. 10, Sheet 7 of 7, for Tag "1030", in Line 3, delete "BITRATES" and insert -- BIT RATES --, therefor.

In the Specification

In Column 4, Line 41, delete "to determines" and insert -- to determine --, therefor.

In Column 4, Line 43, delete "tranport" and insert -- transport --, therefor.

In Column 7, Line 7, delete "Quicktime," and insert -- QuickTime, --, therefor.

In Column 8, Line 27, delete "larger then" and insert -- larger than --, therefor.

In Column 8, Line 29, delete "PBS" and insert -- PES --, therefor.

In Column 9, Line 65, delete "progressively," and insert -- progressively --, therefor.

In the Claims

In Column 15, Line 11, in Claim 7, delete "period" and insert -- period; --, therefor.

In Column 15, Line 20, in Claim 7, delete "form the" and insert -- from the --, therefor.

In Column 16, Lines 16-17, in Claim 13, delete "form the" and insert -- from the --, therefor.

Signed and Sealed this  
First Day of April, 2014

Michelle K. Lee  
*Deputy Director of the United States Patent and Trademark Office*